(12) United States Patent
Suzuki et al.

(10) Patent No.: US 11,070,021 B2
(45) Date of Patent: Jul. 20, 2021

(54) FIBER LASER DEVICE

(71) Applicant: Fujikura Ltd., Tokyo (JP)

(72) Inventors: Ren Suzuki, Sakura (JP); Naoki Murakoshi, Sakura (JP)

(73) Assignee: FUJIKURA LTD., Tokyo (JP)

( * ) Notice: Subject to any disclaimer, the term of this patent is extended or adjusted under 35 U.S.C. 154(b) by 65 days.

(21) Appl. No.: 16/342,247

(22) PCT Filed: Oct. 18, 2017

(86) PCT No.: PCT/JP2017/037673
§ 371 (c)(1),
(2) Date: Apr. 16, 2019

(87) PCT Pub. No.: WO2018/074511
PCT Pub. Date: Apr. 26, 2018

(65) Prior Publication Data
US 2019/0252847 A1 Aug. 15, 2019

(30) Foreign Application Priority Data
Oct. 21, 2016 (JP) .............................. JP2016-207112

(51) Int. Cl.
*H01S 3/117* (2006.01)
*H01S 3/067* (2006.01)
(Continued)

(52) U.S. Cl.
CPC .............. *H01S 3/117* (2013.01); *H01S 3/067* (2013.01); *H01S 3/06754* (2013.01);
(Continued)

(58) Field of Classification Search
CPC .... H01S 3/1655; H01S 3/06791; H01S 3/117; H01S 3/30; H01S 3/2308; H01S 3/11; H01S 3/067; H01S 3/23; H01S 3/094
(Continued)

(56) References Cited

U.S. PATENT DOCUMENTS 5,878,071 A * 3/1999 Delavaux .............. H01S 3/1109
372/10
5,956,355 A * 9/1999 Swanson ............ A61B 1/00183
356/479
(Continued)

FOREIGN PATENT DOCUMENTS

CN 1397832 A 2/2003
CN 103080995 A 5/2013
(Continued)

OTHER PUBLICATIONS

International Search Report dated Jan. 9, 2018, issued in counterpart application No. PCT/JP2017/037673 (2 pages).
(Continued)

*Primary Examiner* — Tuan N Nguyen
(74) *Attorney, Agent, or Firm* — Westerman, Hattori, Daniels & Adrian, LLP

(57) ABSTRACT

A seed unit (MO) includes a plurality of optical paths sharing a part thereof and causing light to be resonated thereon, an amplification optical fiber (13) serving as a part of each of the optical paths and amplifying respective light beams resonated on the respective optical paths, and; an AOM (14) arranged at a part shared by the respective optical paths and switchable between a first state, in which the AOM (14) vibrates at a predetermined cycle and emits light incident from the optical paths to the optical paths, and a second state, in which the AOM (14) emits light incident from the optical paths to a path other than the optical paths. A resonance cycle of light having highest power out of the light beams resonated on the optical paths and the predetermined cycle at which the AOM (14) vibrates in the first state have a non-integral multiple relationship.

8 Claims, 5 Drawing Sheets

(51) Int. Cl.
  *H01S 3/23* (2006.01)
  *H01S 3/094* (2006.01)
  *H01S 3/16* (2006.01)
  *H01S 3/0941* (2006.01)
  *H01S 3/30* (2006.01)

(52) U.S. Cl.
  CPC ........ *H01S 3/06791* (2013.01); *H01S 3/0941* (2013.01); *H01S 3/094003* (2013.01); *H01S 3/1618* (2013.01); *H01S 3/1655* (2013.01); *H01S 3/2308* (2013.01); *H01S 3/302* (2013.01)

(58) Field of Classification Search
  USPC ................................................ 372/6; 385/37
  See application file for complete search history.

(56) References Cited

U.S. PATENT DOCUMENTS

| | | | | |
|---|---|---|---|---|
| 8,441,718 | B2* | 5/2013 | Mead | H01S 3/0675 359/326 |
| 8,995,478 | B1* | 3/2015 | Kobtsev | H01S 3/06712 372/6 |
| 2005/0276286 | A1* | 12/2005 | MacCormack | H01S 3/117 372/10 |
| 2006/0133432 | A1 | 6/2006 | Dragic | |
| 2009/0285246 | A1 | 11/2009 | Seo et al. | |
| 2010/0329288 | A1* | 12/2010 | Kitabayashi | H01S 3/2308 372/6 |
| 2010/0329618 | A1 | 12/2010 | Dong et al. | |
| 2011/0122482 | A1* | 5/2011 | Mead | H01S 3/0675 359/327 |
| 2011/0134940 | A1* | 6/2011 | Hartog | H01S 3/302 372/6 |
| 2012/0307848 | A1* | 12/2012 | Kitabayashi | H01S 3/2308 372/6 |
| 2013/0336343 | A1* | 12/2013 | Miyabe | H01S 3/06716 372/6 |
| 2015/0229097 | A1* | 8/2015 | Oba | H01S 3/0912 372/6 |
| 2016/0268764 | A1* | 9/2016 | Giessen | G02F 1/139 |
| 2017/0179670 | A1 | 6/2017 | Kashiwagi | |

FOREIGN PATENT DOCUMENTS

| | | |
|---|---|---|
| CN | 104169763 A | 11/2014 |
| EP | 3176886 A1 | 6/2017 |
| JP | 2001-267667 A | 9/2001 |
| JP | 2012-129423 A | 7/2012 |
| JP | 2012-164860 A | 8/2012 |
| JP | 2016-86119 A | 5/2016 |
| JP | 2016-171208 A | 9/2016 |
| WO | 2012/108248 A1 | 8/2012 |
| WO | 2016/143713 A1 | 9/2016 |

OTHER PUBLICATIONS

Cascante—Vindas J, et al: "Supercontinuum Q-switched Yb Fiber laser using an intracavity mircostructured fiber", Optics Letters, Optical Society of America, US, vol. 34, No. 23, Dec. 1, 2009, pp. 3628-3630, cited in Extended European Search Report dated May 6, 2020. (3 pages).

* cited by examiner

FIBER LASER DEVICE

TECHNICAL FIELD

The present invention relates to a fiber laser device emitting pulsed emitted light.

BACKGROUND ART

As one of laser devices for use in a processing machine performing processing with use of laser light, a medical instrument such as a scalpel using laser light, and the like, a fiber laser device amplifying and emitting signal light by means of rare earth doped fiber is used. As one of such fiber laser devices, an MO-PA (Master Oscillator Power Amplifier) fiber laser device amplifying and emitting a seed is known. A seed unit serving as an MO unit emitting a seed in this fiber laser device is a fiber laser device emitting as the seed light pumped based on pumping light in some cases.

Patent Literature 1 shown below describes a resonance-type fiber laser device pumping light between paired FBGs (Fiber Bragg Gratings) pinching an amplification optical fiber and a fiber-ring fiber laser device pumping light in a looped optical path partially including an amplification optical fiber. In each of these fiber laser devices, a Q switch is used to emit pulsed light. In general, the Q switch is an AOM (Acoustic Optic Modulation). The acoustic optic modulation causes incident light to propagate in different directions depending on whether the acoustic optic modulation is in an on state or in an off state. When the acoustic optic modulation is in the on state, the acoustic optic modulation causes light to propagate so that light emitted from the amplification optical fiber may partially enter the amplification optical fiber. Thus, light emitted from the amplification optical fiber and entering the amplification optical fiber again is amplified, and amplified light is emitted. Conversely, when the acoustic optic modulation is in the off state, the acoustic optic modulation causes light to propagate so that light emitted from the amplification optical fiber may not enter the amplification optical fiber again.
[Patent Literature 1] JP2012-164860 A

SUMMARY OF INVENTION

Meanwhile, the acoustic optic modulation is in the on state when the acoustic optic modulation is vibrating in synchronization with an input RF signal. The present inventors have discovered that a ripple synchronized with a vibration cycle of the acoustic optic modulation is sometimes generated in light emitted from the fiber laser device described in Patent Literature 1 shown above, and that the ripple is sometimes enlarged.

An object of the present invention is to provide a fiber laser device enabling a ripple of emitted light to be restricted.

The present inventors have closely studied a reason why the ripple synchronized with the vibration cycle of the acoustic optic modulation is enlarged. As a result, the present inventors have discovered that the ripple is sometimes enlarged due to a relationship between the vibration cycle of the acoustic optic modulation and a length of an optical path on which amplified light is resonated. The present inventors have arrived at the present invention through further concerted study.

That is, the present invention provides a fiber laser device including a plurality of optical paths sharing a part thereof and causing light to be resonated thereon, an amplification optical fiber serving as a part of each of the optical paths and amplifying respective light beams resonated on the respective optical paths, and an acoustic optic modulation arranged at a part shared by the respective optical paths and switchable between a first state, in which the acoustic optic modulation vibrates at a predetermined cycle and emits light incident from the optical paths to the optical paths, and a second state, in which the acoustic optic modulation emits light incident from the optical paths to a path other than the optical paths. A resonance cycle of light having highest power out of the respective light beams resonated on the respective optical paths and the predetermined cycle at which the acoustic optic modulation vibrates in the first state have a non-integral multiple relationship.

The present inventors have discovered that the ripple is enlarged in a case in which the vibration cycle of the acoustic optic modulation which the ripple is synchronized with and the cycle at which light is resonated on the optical path correspond. The present inventors have discovered that the ripple is enlarged in a case in which the vibration cycle of the acoustic optic modulation and the cycle at which light is resonated on the optical path have an integral multiple relationship. Also, in the fiber laser device including the plurality of optical paths, the ripple of light having the highest power out of the light beams resonated on the respective optical paths probably has the largest influence on the ripple of emitted light. In the present invention, the resonance cycle of light having the highest power and the predetermined cycle at which the acoustic optic modulation vibrates have a non-integral multiple relationship. That is, the resonance cycle of light having the highest power is a non-integer multiple of the predetermined cycle at which the acoustic optic modulation vibrates, and the predetermined cycle at which the acoustic optic modulation vibrates is a non-integer multiple of the resonance cycle of light having the highest power. Since the resonance cycle of light having the highest power and the predetermined cycle at which the acoustic optic modulation vibrates have a non-integral multiple relationship, it is possible to restrict the most conspicuous ripple from being enlarged. Thus, with the fiber laser device according to the present invention, the ripple of emitted light can be restricted.

Also, each of the resonance cycles of respective light beams resonated on the respective optical paths and the predetermined cycle at which the acoustic optic modulation vibrates in the first state preferably have a non-integral multiple relationship.

Since each of the resonance cycles of respective light beams and the predetermined cycle at which the acoustic optic modulation vibrates have a non-integral multiple relationship, it is possible to restrict the ripples of the respective light beams from being enlarged.

Also, the plurality of optical paths preferably include a specific optical path and an optical path including the specific optical path and a loop optical path which is connected in the middle of the specific optical path and is formed in a looped shape, and light propagating through the specific optical path preferably deviates to the loop optical path at a predetermined branching ratio, and light propagating through the loop optical path preferably couples with the specific optical path at the predetermined branching ratio.

When an optical path length of the specific optical path is long, swell having a longer cycle than that of the ripple tends to be generated in the waveform of light resonated on the optical path. However, by providing the loop optical path as described above, the swell can be restricted.

In this case, the specific optical path may be an optical path on which light is reciprocated between paired reflection units. In a case in which light is reciprocated and resonated, part of the light can propagate through the loop optical path when the light goes forward and backward. Accordingly, the optical paths are varied, and the swell can further be restricted.

In a case in which the specific optical path is an optical path on which light is reciprocated between the paired reflection units as described above, the predetermined branching ratio may be 3 dB or less, and the resonance cycle of light resonated on the specific optical path and the predetermined cycle at which the acoustic optic modulation vibrates in the first state may have a non-integral multiple relationship.

The present inventors have found that, in a case in which the branching ratio is 3 dB or less in light emitted from the fiber laser device in which light is resonated on the optical path on which light is reciprocated between the paired reflection units, power of light propagating through the specific optical path without propagating the loop optical path is the highest. Consequently, due to the above configuration, since the resonance cycle of light having the highest power and the predetermined cycle at which the acoustic optic modulation vibrates have a non-integral multiple relationship, it is possible to restrict the most conspicuous ripple from being enlarged.

In a case in which the specific optical path is an optical path on which light is reciprocated between the paired reflection units as described above, the predetermined branching ratio may be 3 dB or more and 4.8 dB or less, and the resonance cycle of light resonated on an optical path traveling on the loop optical path one lap in the middle of the specific optical path and the predetermined cycle at which the acoustic optic modulation vibrates in the first state may have a non-integral multiple relationship.

The present inventors have found that, in a case in which the branching ratio is 3 dB or more and 4.8 dB or less, which differs from the above case, in light emitted from the fiber laser device in which light is resonated on the optical path on which light is reciprocated between the paired reflection units, power of light propagating through the loop optical path one lap in the middle of the specific optical path is the highest. Consequently, due to the above configuration, since the resonance cycle of light having the highest power and the predetermined cycle at which the acoustic optic modulation vibrates have a non-integral multiple relationship, it is possible to restrict the most conspicuous ripple from being enlarged.

In a case in which the specific optical path is an optical path on which light is reciprocated between the paired reflection units as described above, the predetermined branching ratio may be 4.8 dB or more, and the resonance cycle of light resonated on an optical path traveling on the loop optical path two laps in the middle of the specific optical path and the predetermined cycle at which the acoustic optic modulation vibrates in the first state may have a non-integral multiple relationship.

The present inventors have found that, in a case in which the branching ratio is 4.8 dB or more in light emitted from the fiber laser device in which light is resonated on the optical path on which light is reciprocated between the paired reflection units, power of light propagating through the loop optical path two laps in the middle of the specific optical path is the highest. Consequently, due to the above configuration, since the resonance cycle of light having the highest power and the predetermined cycle at which the acoustic optic modulation vibrates have a non-integral multiple relationship, it is possible to restrict the most conspicuous ripple from being enlarged.

In a case in which the specific optical path is an optical path on which light is reciprocated between the paired reflection units as described above, the predetermined branching ratio is preferably 2 dB or more and 8 dB or less.

The present inventors have found that, in a case in which the predetermined branching ratio is 2 dB or more and 8 dB or less, power of respective light beams resonated on the plurality of optical paths, such as the light resonated on the specific optical path without traveling on the loop optical path, the light traveling on the loop optical path one lap in the middle of the specific optical path, the light traveling on the loop optical path two laps in the middle of the specific optical path, and the light traveling on the loop optical path three laps in the middle of the specific optical path, is balanced. Accordingly, by employing the above branching ratios, even in a case in which swell is generated in the respective light beams, the swell of the specific light beam can be restricted from being conspicuous, and the swell of the emitted light can be decreased.

Also, the specific optical path may be a looped optical path. Due to such a configuration, in a fiber-ring fiber laser device, the ripple can be restricted.

As described above, according to the present invention, the fiber laser device enabling the ripple of emitted light to be restricted is provided.

DESCRIPTION OF EMBODIMENTS

Hereinbelow, preferred embodiment of a fiber laser device according to the present invention will be described in detail with reference to the drawings.

First Embodiment

Figure 1:
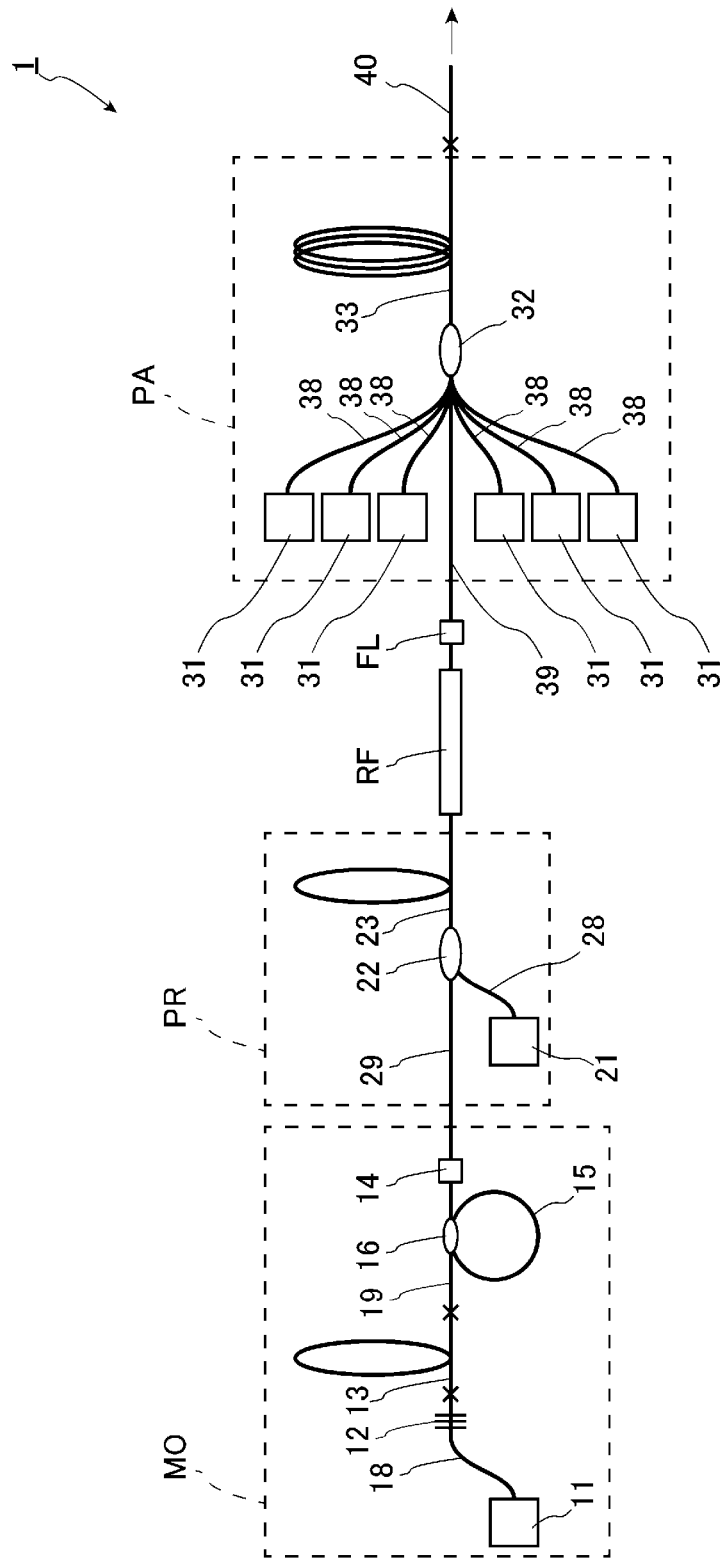
FIG. 1 illustrates a MO-PA fiber laser device including as a light source a fiber laser device according to a first embodiment of the present invention.

FIG. 1 illustrates a fiber laser device according to an embodiment.

As illustrated in FIG. 1, a fiber laser device 1 mainly includes a seed unit MO emitting a seed, a preamplifier PR amplifying the seed emitted from the seed unit MO, a main amplifier PA, a wavelength conversion unit RF provided between the seed unit MO and the preamplifier PR, and an optical filter FL provided between the wavelength conversion unit RF and the main amplifier PA. In this manner, the fiber laser device 1 is a so-called MO-PA fiber laser device in which the seed unit MO is a master oscillator, and in which the main amplifier PA is a power amplifier.

<Configuration of Seed Unit MO>

The seed unit MO mainly includes a pumping light source 11 emitting pumping light, an amplification optical fiber 13 having the pumping light emitted from the pumping light source 11 incident thereon and provided with an active element pumped by the pumping light, an FBG (Fiber Bragg Grating) 12 provided on one end side of the amplification optical fiber 13 and serving as a first reflection unit, an acoustic optic modulation (AOM) 14 connected to the other end of the amplification optical fiber 13 and serving as a second reflection unit, an optical coupler 16 provided between the FBG 12 and the AOM 14, and a loop optical fiber 15 connected to the optical coupler 16. In this manner, the seed unit MO is a resonance-type fiber laser device.

The pumping light source 11 of the seed unit MO is a light source emitting continuous light and is a laser diode, for example. The pumping light source 11 emits pumping light having a wavelength causing the active element added to the amplification optical fiber 13 to be pumped, such as light having a wavelength of 915 nm. Also, the pumping light source 11 is connected to a first optical fiber 18, and light emitted from the pumping light source 11 of the seed unit MO propagates through the first optical fiber 18.

The amplification optical fiber 13 of the seed unit MO includes a core and a cladding tightly surrounding the outer circumferential surface of the core. In the amplification optical fiber 13, the refractive index of the core is higher than that of the cladding, and examples of a material for the core are an element, such as germanium, raising the refractive index and quartz provided with an active element such as ytterbium (Yb) pumped by light of the seed unit emitted from the pumping light source 11 of the seed unit MO. An example of such an active element is a rare earth element, and examples of the rare earth element are thulium (Tm), cerium (Ce), neodymium (Nd), europium (Eu), and erbium (Er), in addition to the aforementioned Yb. Another example of the active element is bismuth (Bi), in addition to the rare earth element. Also, an example of a material for the cladding of the amplification optical fiber 13 is pure quartz provided with no dopant.

The aforementioned first optical fiber 18 is connected to one end of the amplification optical fiber 13, and the core of the first optical fiber 18 and the core of the amplification optical fiber 13 are optically coupled. Also, the core of the first optical fiber 18 is provided with the FBG 12. In this manner, the FBG 12 is provided on one end side of the amplification optical fiber 13. The FBG 12 has portions each having a high refractive index at a constant cycle along the longitudinal direction of the first optical fiber 18 and, by adjusting this cycle, reflects light having a specific wavelength out of light beams emitted from the pumped active element of the amplification optical fiber 13. In a case in which the active element added to the amplification optical fiber 13 is ytterbium as described above, the reflectance at which the FBG 12 reflects light having a wavelength of 1060 nm is 100%.

To the other end of the amplification optical fiber 13 is connected one end of a second optical fiber 19. The configuration of the second optical fiber is similar to that of the first optical fiber, and the core of the second optical fiber 19 and the core of the amplification optical fiber 13 are optically coupled.

The configuration of the loop optical fiber 15 is similar to those of the first optical fiber 18 and the second optical fiber 19, and the loop optical fiber 15 is connected at the optical coupler 16 provided in the middle of the second optical fiber 19 to the second optical fiber 19. Specifically, in a state in which one end and the other end of the optical fiber serving as the loop optical fiber 15 are connected, the portion including one end and the other end and the second optical fiber 19 are twisted together a certain number of times and are fusion-spliced. The fusion-spliced portion of the second optical fiber 19 and the loop optical fiber 15 is the optical coupler 16. Hence, at the optical coupler 16, the core of the second optical fiber 19 and the core of the loop optical fiber 15 are optically coupled at a predetermined branching ratio.

The branching ratio means the following two ratios. One ratio is, at the optical coupler 16, a ratio of power of light propagating from the second optical fiber 19 through the second optical fiber without deviating to the loop optical fiber 15 to power of light deviating from the second optical fiber 19 to the loop optical fiber 15. The other ratio is, at the optical coupler 16, a ratio of power of light propagating from the loop optical fiber 15 through the loop optical fiber 15 without coupling with the second optical fiber 19 to power of light propagating from the loop optical fiber 15 and coupling with the second optical fiber 19. In this case, the respective ratios are equal to each other. In a case in which each of these power ratios is represented in decibel, and in which the ratio is 3 db, for example, light with approximately 50% power out of power of light propagating through the second optical fiber and incident on the optical coupler 16 propagates through the second optical fiber 19, and light with the remaining approximately 50% power deviates to the loop optical fiber 15. Hence, in a case in which the branching ratio is nearly 0 dB, light propagating through the second optical fiber 19 hardly deviates to the loop optical fiber 15. The branching ratio is defined by the aforementioned number of times of twisting the optical fiber serving as the loop optical fiber 15 and the second optical fiber 19 together when the loop optical fiber 15 and the second optical fiber 19 are fusion-spliced as described above.

To the other end of the second optical fiber 19 is connected the AOM 14. The AOM 14 can switch between a first state and a second state. The first state is a state in which the AOM 14 is on. In this state, the AOM 14 vibrates at a predetermined cycle. In the first state, while light incident from the core of the second optical fiber 19 propagates through the AOM 14 toward the preamplifier PR, the light generates Fresnel reflection on the end surface of the AOM 14 on the side on which the preamplifier PR is located and is emitted toward the core of the second optical fiber 19 again. The reflectance of this Fresnel reflection is lower than the reflectance of the FBG 12. Also, the second state is a state in which the AOM 14 is off and in which the AOM 14 vibrates at a different cycle from that in the first state. In the second state, light incident from the core of the second optical fiber 19 propagates through the AOM 14 in a different direction from that in the first state. Hence, in the second state, light incident on the AOM 14 is emitted in a different direction from that toward the second optical fiber 19.

As described above, in the seed unit MO according to the present embodiment, light is reciprocated and resonated on the optical path including a part of the first optical fiber 18, the amplification optical fiber 13, the second optical fiber 19, and the AOM 14. In a case in which this optical path is a specific optical path, and in which the looped optical path including the loop optical fiber 15 is a loop optical path, the seed unit MO includes not only the aforementioned specific optical path but also an optical path including the specific optical path and the loop optical path. The optical path including the specific optical path and the loop optical path is a different optical path from the specific optical path and shares a part with the specific optical path. Light propagating through this optical path deviates at the optical coupler 16 from the second optical fiber 19 to the loop optical fiber 15, travels through the loop optical fiber 15 one or more laps, and couples with the second optical fiber 19 at the optical coupler 16 from the loop optical fiber 15. Also, the optical paths each including the loop optical path are different optical paths from each other in a case in which the optical paths respectively have different numbers of times of the lap travel through the loop optical fiber 15. In this manner, since the loop optical fiber 15 is connected in the middle of the specific optical path, the lengths of the respective optical paths differ from each other, and the resonance cycles of the respective light beams resonated on the respective optical paths differ from each other.

In the present embodiment, at least the resonance cycle of light having the highest power out of the respective light beams resonated on the respective optical paths and the predetermined cycle at which the AOM 14 vibrates in the first state have a non-integral multiple relationship. That is, the resonance cycle of light having the highest power out of the respective light beams resonated on the respective optical paths is a non-integer multiple of the predetermined cycle at which the AOM 14 vibrates in the first state, and the predetermined cycle at which the AOM 14 vibrates in the first state is a non-integer multiple of the resonance cycle of light having the highest power out of the respective light beams resonated on the respective optical paths. In addition, each of the resonance cycles of respective light beams resonated on the respective optical paths and the predetermined cycle at which the AOM 14 vibrates in the first state preferably have a non-integral multiple relationship. In this case, each of the resonance cycles of respective light beams resonated on the respective optical paths is a non-integer multiple of the predetermined cycle at which the AOM 14 vibrates in the first state, and the predetermined cycle at which the AOM 14 vibrates in the first state is a non-integer multiple of each of the resonance cycles of respective light beams resonated on the respective optical paths. For example, in a case in which the vibration frequency at which the AOM 14 vibrates is 135 MHz, the vibration cycle is $74 \times 10^{-10}$ seconds. Considered is a case in which the length of the aforementioned specific optical path is a basic optical path length S, in which the light speed is 299,792,458 m/s, and in which the refractive index of the optical fiber is 1.445. The light speed in a material is 1/refractive index times. Hence, when the basic optical path length S is 1 m, the resonance cycle of light resonated on the specific optical path is equal to the period in which light is reciprocated through the specific optical path, which is approximately $1.0 \times 10^{-8}$ seconds. In this case, the resonance cycle of light resonated on the specific optical path and the predetermined cycle at which the AOM 14 vibrates in the first state have a non-integral multiple relationship. Also, in a case in which the basic optical path length S is 1 m, and in which a loop optical path length L serving as a length of the loop optical fiber 15 is 0.5 m, the resonance cycle of resonated light is approximately $1.3 \times 10^{-8}$ seconds on an optical path on which the light travels through the loop optical path one lap while the light is resonated, and the resonance cycle of resonated light is approximately $1.5 \times 10^{-8}$ seconds on an optical path on which the light travels through the loop optical path two laps while the light is resonated. Hence, in this case, each of the resonance cycles of respective light beams resonated on the respective optical paths and the predetermined cycle at which the AOM 14 vibrates in the first state have a non-integral multiple relationship.

Meanwhile, the amplification optical fiber 13 is a part of each of the optical paths, and the AOM 14 is arranged at a part shared by the respective optical paths.

<Configuration of Preamplifier PR>

The preamplifier PR mainly includes a pumping light source 21, an amplification optical fiber 23, and a coupler 22.

The pumping light source 21 of the preamplifier PR includes a plurality of laser diodes, for example, and emits pumping light having a wavelength causing an active element added to the amplification optical fiber 23 of the preamplifier PR to be pumped, such as light having a wavelength of 915 nm, as described below. Also, the pumping light source 21 is connected to an optical fiber 28, and pumping light emitted from the pumping light source 21 propagates through the optical fiber 28. The optical fiber 28 is a multimode fiber, for example, and in this case, the pumping light propagates through the optical fiber 28 as multimode light.

The amplification optical fiber 23 of the preamplifier PR includes a core, an inner cladding tightly surrounding the outer circumferential surface of the core, and an outer cladding covering the outer circumferential surface of the inner cladding. In the amplification optical fiber 23, the refractive index of the core is higher than that of the inner cladding, and the refractive index of the inner cladding is higher than that of the outer cladding. That is, the amplification optical fiber is in a double-clad structure. In the amplification optical fiber 23, examples of a material for the core are similar materials to those for the core of the amplification optical fiber 13 of the aforementioned seed unit MO, and examples of a material for the inner cladding are similar materials to those for the cladding of the amplification optical fiber 13 of the aforementioned seed unit MO. Also, an example of a material for the outer cladding of the amplification optical fiber 23 is an ultraviolet curable resin.

In the present embodiment, the AOM 14 of the seed unit MO is connected to the optical fiber 29. The coupler 22 connects the optical fiber 29 and the optical fiber 28 to one end of the amplification optical fiber 23. Specifically, at the coupler 22, the core of the optical fiber 29 is connected to the core of the amplification optical fiber 23, and the core of the optical fiber 28 is connected to the inner cladding of the amplification optical fiber 23. Hence, light emitted from the AOM 14 of the seed unit MO enters the core of the amplification optical fiber 23 via the optical fiber 29 and propagates through the core. Also, pumping light emitted from the pumping light source 21 enters the inner cladding of the amplification optical fiber 23 and mainly propagates through the inner cladding. Accordingly, due to light propagating through the core of the amplification optical fiber 23, the active element pumped by pumping light emitted from the pumping light source 21 causes stimulated emission, and light propagating through the core is thus amplified.

<Configurations of Wavelength Conversion Unit RF and Optical Filter FL>

The wavelength conversion unit RF is connected to the amplification optical fiber 23 of the preamplifier PR. The wavelength conversion unit RF converts light having higher power than predetermined power out of incident light into light having a longer wavelength than that of the incident light and emits light having lower power than the predetermined power out of the incident light, keeping the wavelength of the incident light.

An example of such a wavelength conversion unit RF is a Raman optical fiber causing stimulated Raman scattering. As the Raman optical fiber, an optical fiber provided in the core with a dopant raising a non-linear optical constant. Examples of such a dopant are germanium and phosphorus. In a case in which the wavelength conversion unit RF is a Raman optical fiber, a threshold value of intensity of light for wavelength conversion can be changed depending on the diameter of the core, the concentration of the dopant to be added to the core, the length of the core, and the like.

The optical filter FL receives light emitted from the preamplifier PR via the wavelength conversion unit RF. In a case in which light subjected to wavelength conversion in the wavelength conversion unit RF enters the optical filter FL, the optical filter FL transmits the light toward the main amplifier PA, and in a case in which light subjected to no wavelength conversion in the wavelength conversion unit RF enters the optical filter FL, the optical filter FL restricts transmission of the light toward the main amplifier PA. Accordingly, in a case in which light emitted from the preamplifier PR is subjected to wavelength conversion in the wavelength conversion unit RF, light incident on the optical filter FL is transmitted through the optical filter FL toward the main amplifier PA. Conversely, in a case in which light emitted from the preamplifier PR is not subjected to wavelength conversion in the wavelength conversion unit RF, transmission of light incident on the optical filter FL through the optical filter FL toward the main amplifier PA is restricted. Examples of such an optical filter FL are a WDM coupler and a dielectric multilayer filter.

<Configuration of Main Amplifier PA>

The main amplifier PA differs from the preamplifier PR in that the main amplifier PA amplifies incident light with higher gain than that of the preamplifier PR and mainly includes a plurality of pumping light sources 31, an amplification optical fiber 33, and a coupler 32.

Each of the pumping light sources 31 of the main amplifier PA includes a plurality of laser diodes, for example, and emits pumping light having a wavelength causing an active element added to the amplification optical fiber 33 of the main amplifier PA to be pumped, such as light having a wavelength of 915 nm, as described below. Also, each of the pumping light sources 31 is connected to each of optical fibers 38, and pumping light emitted from each of the pumping light sources 31 propagates through each of the optical fibers 38. Each of the optical fibers 38 is similar to the optical fiber 28 connected to the pumping light source 21 of the preamplifier PR, for example, and in this case, the pumping light propagates through the optical fiber 38 as multimode light.

The amplification optical fiber 33 of the main amplifier PA has a similar configuration to that of the amplification optical fiber 23 of the preamplifier PR.

Also, in the present embodiment, the optical filter FL is connected to an optical fiber 39. The coupler 32 connects the optical fiber 39 and the respective optical fibers 38 to one end of the amplification optical fiber 33. Specifically, at the coupler 32, the core of the optical fiber 39 is connected to the core of the amplification optical fiber 33, and the cores of the respective optical fibers 38 are connected to the inner cladding of the amplification optical fiber 33. Hence, light emitted from the optical filter FL toward the main amplifier PA enters the core of the amplification optical fiber 33 via the optical fiber 39 and propagates through the core, and pumping light emitted from each of the pumping light sources 31 enters the inner cladding of the amplification optical fiber 33 and mainly propagates through the inner cladding. Accordingly, due to light propagating through the core of the amplification optical fiber 33, an active element pumped by pumping light emitted from the pumping light sources 31 causes stimulated emission, and light propagating through the core is thus amplified.

To the other end of the amplification optical fiber 33 of the main amplifier PA is connected an optical fiber 40. This optical fiber 40 is an optical fiber causing light emitted from the amplification optical fiber 33 to propagate to a predetermined position and emitting the light and is sometimes called a delivery optical fiber.

<Operation of Fiber Laser Device 1>

Next, an operation of emitting pulsed light from such a fiber laser device 1 will be described.

In the fiber laser device 1 according to the present embodiment, pumping light is being emitted from the pumping light source 11 of the seed unit MO at all times, and in a standby state, the AOM 14 of the seed unit MO is in a second state. Hence, light incident on the AOM 14 from the second optical fiber 19 is not reflected toward the second optical fiber 19 but is emitted to the outside. Thus, light is not resonated on the optical path between the FBG 12 and the end surface of the AOM 14 on the side on which the preamplifier is located, that is, the specific optical path or the optical path including the specific optical path and the loop optical path. Consequently, the pumping level of the active element of the amplification optical fiber 13 is raised. Also, in the present embodiment, in the standby state, each of the pumping light sources 21 and is in an emitting state. Thus, the active elements added to the amplification optical fiber 23 of the preamplifier PR and the amplification optical fiber 33 of the main amplifier PA are in pumped states. Meanwhile, a period in which the AOM 14 of the seed unit MO is in the second state is a period of no self oscillation in the amplification optical fiber 13. Also, a period in which pumping light enters the amplification optical fiber 23 and the amplification optical fiber 33 is a period of no self oscillation. Accordingly, in the standby state, unintended giant pulse light is restricted from being emitted from the amplification optical fibers 13, 23, and 33.

Subsequently, immediately before pulsed light is emitted, the AOM 14 comes in the first state. Light is then reciprocated on the optical path between the FBG 12 and the end surface of the AOM 14 on the side on which the preamplifier is located, that is, the specific optical path including the part of the first optical fiber 18, the amplification optical fiber 13, the second optical fiber 19, and the AOM 14 and the optical path including the specific optical path and the loop optical path, and the light is resonated on the respective optical paths. Due to this resonance light, the active element in the amplification optical fiber 13 highly pumped as described above causes stimulated emission, the resonance light is amplified, pulsed light is emitted from the AOM 14, and pulsed light serving as a seed is emitted from the seed unit MO.

Figure 2:
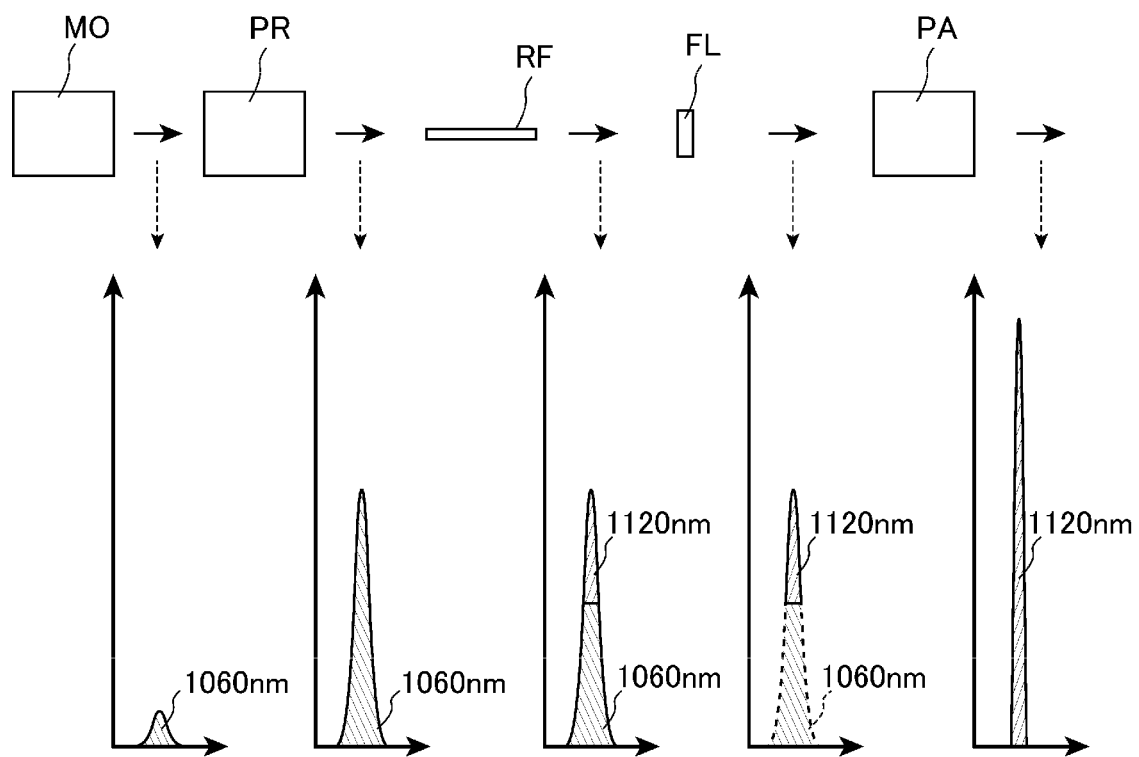
FIG. 2 schematically illustrates magnitude of power of light emitted from respective units of the fiber laser device in FIG. 1.

FIG. 2 illustrates magnitude of power of light emitted from the respective units when pulsed light is emitted. Specifically, FIG. 2 illustrates temporal changes of magnitude of power, and wavelength states, of light emitted from the seed unit MO, light emitted from the preamplifier PR, light emitted from the wavelength conversion unit RF, light emitted from the optical filter FL, and light emitted from the main amplifier PA. At each part of FIG. 2 illustrating temporal changes of power of respective light beams, the vertical axis represents power density of the light, and the horizontal axis represents time.

The form of the temporal changes of the power of the pulsed light emitted from the seed unit MO is a form of a Gaussian profile. Also, the wavelength of the pulsed light emitted from the seed unit MO is 1060 nm, for example. As described above, the pulsed light emitted from the seed unit MO enters the core of the amplification optical fiber 23.

In the amplification optical fiber 23 of the preamplifier PR, the active element is in a pumped state due to the pumping light as described above. Hence, when the pulsed light is incident on the amplification optical fiber 23 from the seed unit MO, the pumped active element causes stimulated emission due to the light from the seed unit MO, power of the light is amplified by this stimulated emission, and pulsed light is emitted from the amplification optical fiber 23. When the amplification optical fiber 23 receives light having power whose temporal changes are formed in a Gaussian profile, the amplification optical fiber 23 emits light of a Gaussian profile form whose power density is amplified further than that of the incident light. Accordingly, as illustrated in FIG. 2, from the preamplifier PR, the light of the Gaussian profile form having power whose temporal changes form is extended further in a direction of power density than that of the light emitted from the seed unit MO is emitted.

A part of the light emitted from the preamplifier PR has power density at which the waveform is converted in the wavelength conversion unit RF. Thus, in the wavelength conversion unit RF, a light component at higher power density than specified power density in the light incident from the preamplifier PR is primary scattering light. For example, in a case in which the wavelength of light emitted from the seed unit MO is 1060 nm as described above, the wavelength of light having higher power than the predetermined power in the wavelength conversion unit RF is 1120 nm. From the wavelength conversion unit RF, light subjected to no wavelength conversion and primary scattering light are emitted. The form of the temporal changes of the power of the light emitted from the wavelength conversion unit RF is equal to the form of the temporal changes of the power of the light emitted from the preamplifier PR. In this form, as illustrated in FIG. 2, the light having a wavelength of 1060 nm and subjected to no wavelength conversion is light having low power density including tail portions of the Gaussian profile form, and the light having a wavelength of 1120 nm and serving as primary scattering light is light having high power density including an apex portion of the Gaussian profile form.

The light emitted from the wavelength conversion unit RF enters the optical filter FL. As described above, when the light subjected to wavelength conversion in the wavelength conversion unit RF enters the optical filter FL, the optical filter FL transmits the light toward the main amplifier PA, and when the light subjected to no wavelength conversion in the wavelength conversion unit RF enters the optical filter FL, the optical filter FL restricts transmission of the light toward the main amplifier PA. Accordingly, out of light emitted from the preamplifier PR, transmission of the light subjected to no wavelength conversion and having low power density through the optical filter FL is restricted as illustrated by the dashed lines in FIG. 2, and the primary scattering light emitted from the preamplifier PR as illustrated by the solid lines in FIG. 2 is transmitted through the optical filter FL. The pulse width of the primary scattering light is shorter than the pulse width of the light emitted from the preamplifier PR.

In the amplification optical fiber 33 of the main amplifier PA, the active element is in a pumped state due to the pumping light as described above. Hence, when the pulsed light having a shorter pulse width is incident on the optical filter FL, the pumped active element causes stimulated emission due to the light, power of the light is amplified by this stimulated emission, and pulsed light is emitted from the amplification optical fiber 33. Accordingly, light having a shorter pulse width than that of the light emitted from the seed unit MO and having power thereof amplified is emitted.

The light emitted from the main amplifier PA propagates through the optical fiber 40 and is emitted from the fiber laser device 1.

Meanwhile, there is a case in which light having low power density is emitted even in a case in which no pulsed light is emitted from the seed unit MO. In this case, the active element in the preamplifier PR pumped by the light causes stimulated emission, and the light is amplified. However, since the light from the seed unit MO in this case has low power as described above, the power of the light emitted from the preamplifier PR is not as high as to cause waveform conversion in the wavelength conversion unit RF. For this reason, the light emitted from the preamplifier PR in this case is not subjected to wavelength conversion in the wavelength conversion unit RF, and incidence of the light on the main amplifier PA by means of the optical filter FL is restricted.

Next, the pulsed light emitted from the seed unit MO will be described further in detail.

Figure 3:
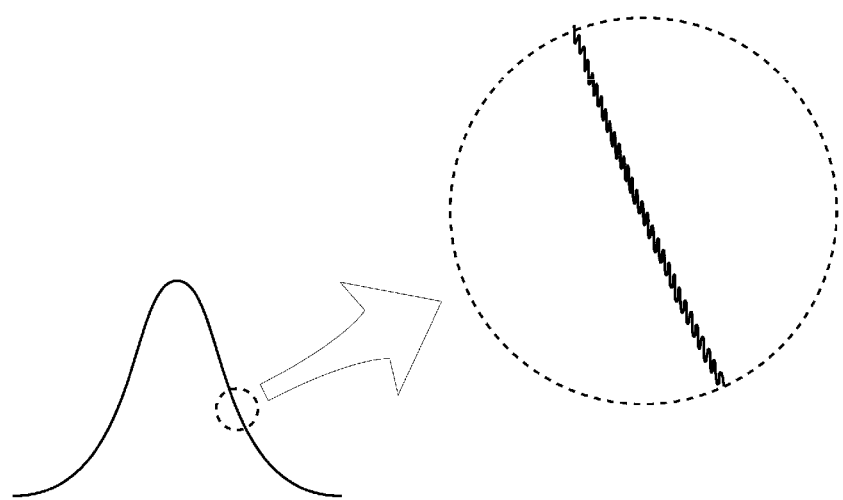
FIG. 3 schematically illustrates a state of pulsed light emitted from a seed unit.

FIG. 3 illustrates the light emitted from the seed unit MO. The left side in FIG. 3 illustrates the light emitted from the seed unit MO illustrated in FIG. 2, and the right side in FIG. 3 illustrates a state in which the portion circled with the dashed line on the left side in FIG. 3 is enlarged. As illustrated in FIG. 3, when the pulsed light emitted from the seed unit MO is enlarged, it is found that small ripples are superposed. The ripples result from vibration of the AOM 14 in the first state. The AOM 14 vibrates in the first state to alternate between a state of easily transmitting light and a state of slightly less easily transmitting light than in the former state. For this reason, ripples tend to be generated in the light transmitted through and emitted from the AOM 14 in sync with the predetermined cycle at which the AOM 14 vibrates.

However, as described above, in the fiber laser device 1 according to the present embodiment, each of the resonance cycles of respective light beams resonated on the respective optical paths in the seed unit MO and the predetermined cycle at which the AOM 14 vibrates in the first state have a non-integral multiple relationship. The present inventors have discovered that amplification of the ripples is restricted in a case in which the resonance cycle of the resonated light and the aforementioned predetermined cycle at which the AOM 14 vibrates in the first state have a non-integral multiple relationship. Consequently, in the pulsed light emitted from the seed unit MO, amplification of the ripples generated due to vibration of the AOM 14 is restricted.

Next, in the present embodiment, the relationship between power of respective light beams resonated on respective optical paths of the seed unit MO and emitted from the seed unit MO and the branching ratio at the optical coupler 16 will be described.

Figure 4:
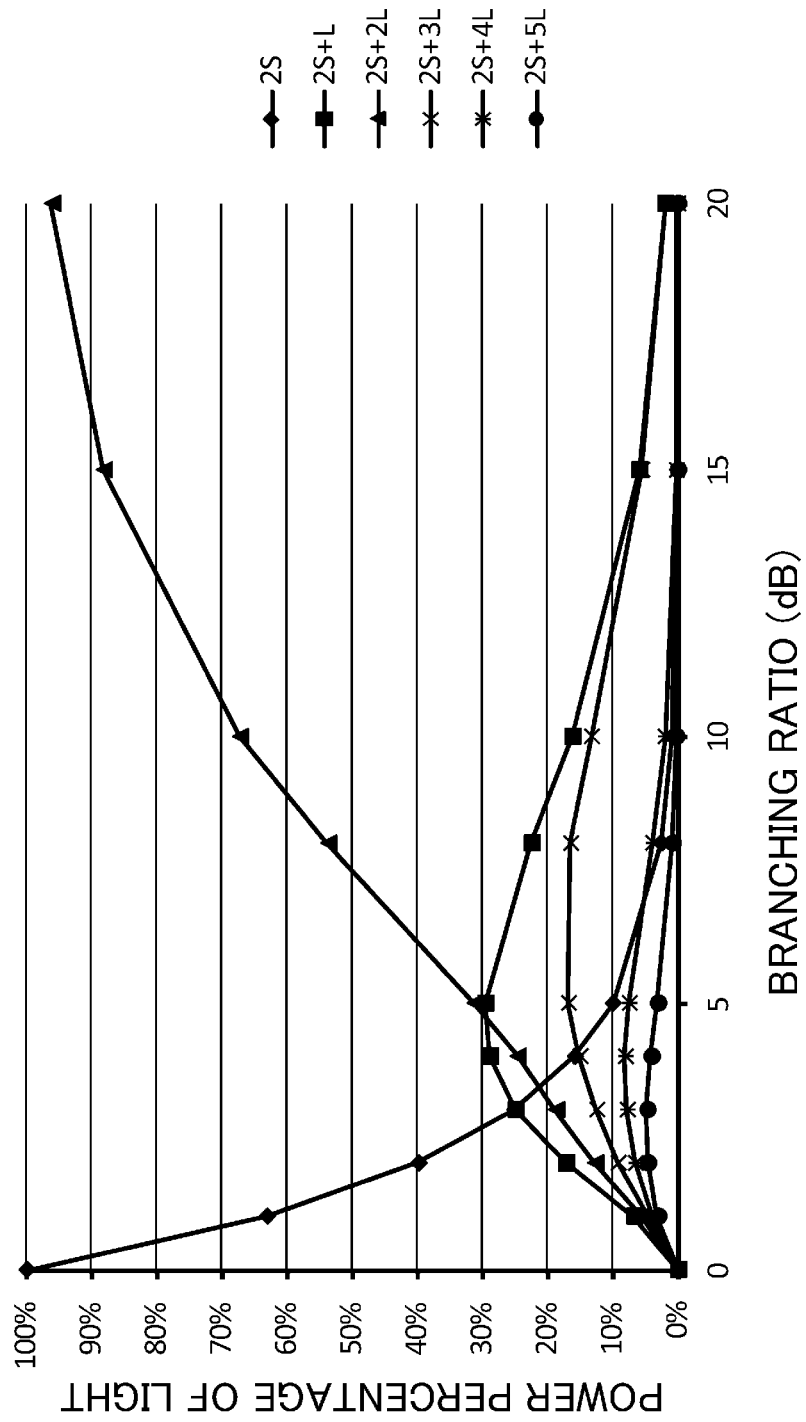
FIG. 4 illustrates the relationship between the power percentages of respective light beams resonated on respective optical paths of the seed unit and emitted from the seed unit and the branching ratio at an optical coupler.

FIG. 4 illustrates the relationship between the power percentages of respective light beams resonated on respective optical paths of the seed unit MO and emitted from the seed unit MO and the branching ratio at the optical coupler 16. The present inventors have discovered that, when the branching ratio is changed, the power percentages of respective light beams resonated on respective optical paths are changed, and that the tendency in FIG. 4 does not depend on the optical path length, the wavelength, and the like.

In FIG. 4, in a case in which the length of the specific optical path is the basic optical path length S, the distance in which light is reciprocated on the specific optical path is 2S. Also, in a case in which the length of the loop optical fiber 15 is the loop optical path length L, the distance in which light travels on the loop optical path one lap in the middle of propagating through the specific optical path is 2S+L. In this case, a first case is a case in which resonated light travels on the loop optical path one lap when the light goes forward on the specific optical path and in which the light does not travel on the loop optical path when the light goes backward, and a second case is a case in which the light does not travel on the loop optical path when the light goes forward on the specific optical path and in which the light travels on the loop optical path one lap when the light goes backward. Also, the distance in which the light travels on the loop optical path two laps in the middle of propagating through the specific optical path is 2S+2L. In this case, a first case is a case in which the resonated light travels on the loop optical path two laps when the light goes forward on the specific optical path and in which the light does not travel on the loop optical path when the light goes backward, a second case is a case in which the light does not travel on the loop optical path when the light goes forward on the specific optical path and in which the light travels on the loop optical path two laps when the light goes backward, and a third case is a case in which the light travels on the loop optical path one lap when the light goes forward on the specific optical path and in which the light travels on the loop optical path one lap when the light goes backward. In a similar way of thinking, the distance in which the light travels on the loop optical path three laps in the middle of propagating through the specific optical path is 2S+3L, the distance in which the light travels on the loop optical path four laps in the middle of propagating through the specific optical path is 2S+4L, and the distance in which the light travels on the loop optical path five laps in the middle of propagating through the specific optical path is 2S+5L. In these cases, all combinations are applied to how to travel on the loop optical path when the light goes forward and backward on the specific optical path.

As is apparent from FIG. 4, when the branching ratio at the optical coupler 16 is 3 dB or less, the power percentage of light resonated on the specific optical path without traveling on the loop optical path is the highest among those of the respective light beams resonated on the respective optical paths. Accordingly, when the branching ratio at the optical coupler 16 is 3 dB or less, the resonance cycle of the light resonated on the specific optical path without traveling on the loop optical path and the predetermined cycle at which the AOM 14 vibrates in the first state have a non-integral multiple relationship. In this case, the resonance cycle of light resonated on another optical path and the predetermined cycle at which the AOM 14 vibrates in the first state preferably have a non-integral multiple relationship. However, since the aforementioned ripples are most influenced by the light resonated on the specific optical path without traveling on the loop optical path, the resonance cycle of light resonated on another optical path and the predetermined cycle at which the AOM 14 vibrates in the first state may not have a non-integral multiple relationship.

Also, when the branching ratio at the optical coupler 16 is 3 dB or more and 4.8 dB or less, the power percentage of light resonated on the optical path of traveling on the loop optical path one lap is the highest among those of the respective light beams resonated on the respective optical paths. Accordingly, when the branching ratio at the optical coupler 16 is 3 dB or more and 4.8 dB or less, the resonance cycle of the resonated light traveling on the loop optical path one lap in the middle of the specific optical path and the predetermined cycle at which the AOM 14 vibrates in the first state have a non-integral multiple relationship. In this case, the resonance cycle of light resonated on another optical path and the predetermined cycle at which the AOM 14 vibrates in the first state preferably have a non-integral multiple relationship. However, since the aforementioned ripples are most influenced by the resonated light traveling on the loop optical path one lap in the middle of the specific optical path, the resonance cycle of light resonated on another optical path and the predetermined cycle at which the AOM 14 vibrates in the first state may not have a non-integral multiple relationship.

Also, when the branching ratio at the optical coupler is 4.8 dB or more, the power percentage of light resonated on the optical path of traveling on the loop optical path two laps is the highest among those of the respective light beams resonated on the respective optical paths. Accordingly, when the branching ratio at the optical coupler 16 is 4.8 dB or more, the resonance cycle of the resonated light traveling on the loop optical path two laps in the middle of the specific optical path and the predetermined cycle at which the AOM 14 vibrates in the first state have a non-integral multiple relationship. In this case, the resonance cycle of light resonated on another optical path and the predetermined cycle at which the AOM 14 vibrates in the first state preferably have a non-integral multiple relationship. However, since the aforementioned ripples are most influenced by the resonated light traveling on the loop optical path two laps in the middle of the specific optical path, the resonance cycle of light resonated on another optical path and the predetermined cycle at which the AOM 14 vibrates in the first state may not have a non-integral multiple relationship.

Next, swell of pulsed light that is easily generated in a case in which the optical path length is long will be described.

In a case in which the basic optical path length S of the specific optical path is long, swell is sometimes generated in the Gaussian profile form of pulsed light to be emitted from the specific optical path. The cycle of the swell is much longer than the cycle of the ripple. However, in the fiber laser device according to the present embodiment, not only light resonated on the specific optical path but also resonated light traveling on the loop optical path in addition to the specific optical path. Accordingly, even in a case in which the basic optical path length S is long enough to cause swell to be generated in the form of the pulsed light resonated on the specific optical path, the light emitted from the seed unit MO is combination of light resonated on the specific optical path without traveling on the loop optical path and resonated light traveling on the loop optical path in the middle of the specific optical path, and the swell is thus decreased. In particular, as illustrated in FIG. 4, when the branching ratio at the optical coupler 16 is 2 dB or more and 8 dB or less, the power of the light resonated on the specific optical path without traveling on the loop optical path, the power of the resonated light traveling on the loop optical path one lap in the middle of the specific optical path, and the power of the resonated light traveling on the loop optical path two laps in the middle of the specific optical path are respectively balanced. Accordingly, even in a case in which the basic optical path length S is long, it is possible to restrict the swell from being generated in the emitted pulsed light as long as the branching ratio at the optical coupler 16 is 2 dB or more and 8 dB or less. Meanwhile, in a case in which a goal is to restrict the swell from being generated in this manner, unlike the present embodiment, the resonance cycle of light having the highest power out of the respective light beams resonated on the respective optical paths and the predetermined cycle at which the AOM 14 vibrates in the first state may not have a non-integral multiple relationship.

As described above, in the fiber laser device 1 according to the present embodiment, the seed unit MO includes the plurality of optical paths sharing a part thereof and causing light to be resonated thereon, and at least the resonance cycle of light having the highest power out of the respective light beams resonated on the respective optical paths and the predetermined cycle at which the AOM 14 vibrates in the first state have a non-integral multiple relationship. Since the resonance cycle of light having the highest power and the predetermined cycle at which the AOM 14 vibrates have a non-integral multiple relationship, it is possible to restrict the most conspicuous ripples from being enlarged, and the ripples of light emitted from the seed unit MO can be restricted. Accordingly, the ripple of light emitted from the fiber laser device 1 can be restricted.

Further, in the fiber laser device 1 according to the present embodiment, in a case in which each of the resonance cycles of respective light beams resonated on the respective optical paths and the predetermined cycle at which the AOM 14 vibrates in the first state have a non-integral multiple relationship, the ripple of each of the respective light beams can be restricted from being enlarged, which is preferable.

Second Embodiment

Next, a second embodiment of the present invention will be described in detail with reference to FIG. 5. It is to be noted that similar or identical components to those in the first embodiment are shown with the same reference signs, and description of the duplicate components is omitted except as particularly described.

Figure 5:
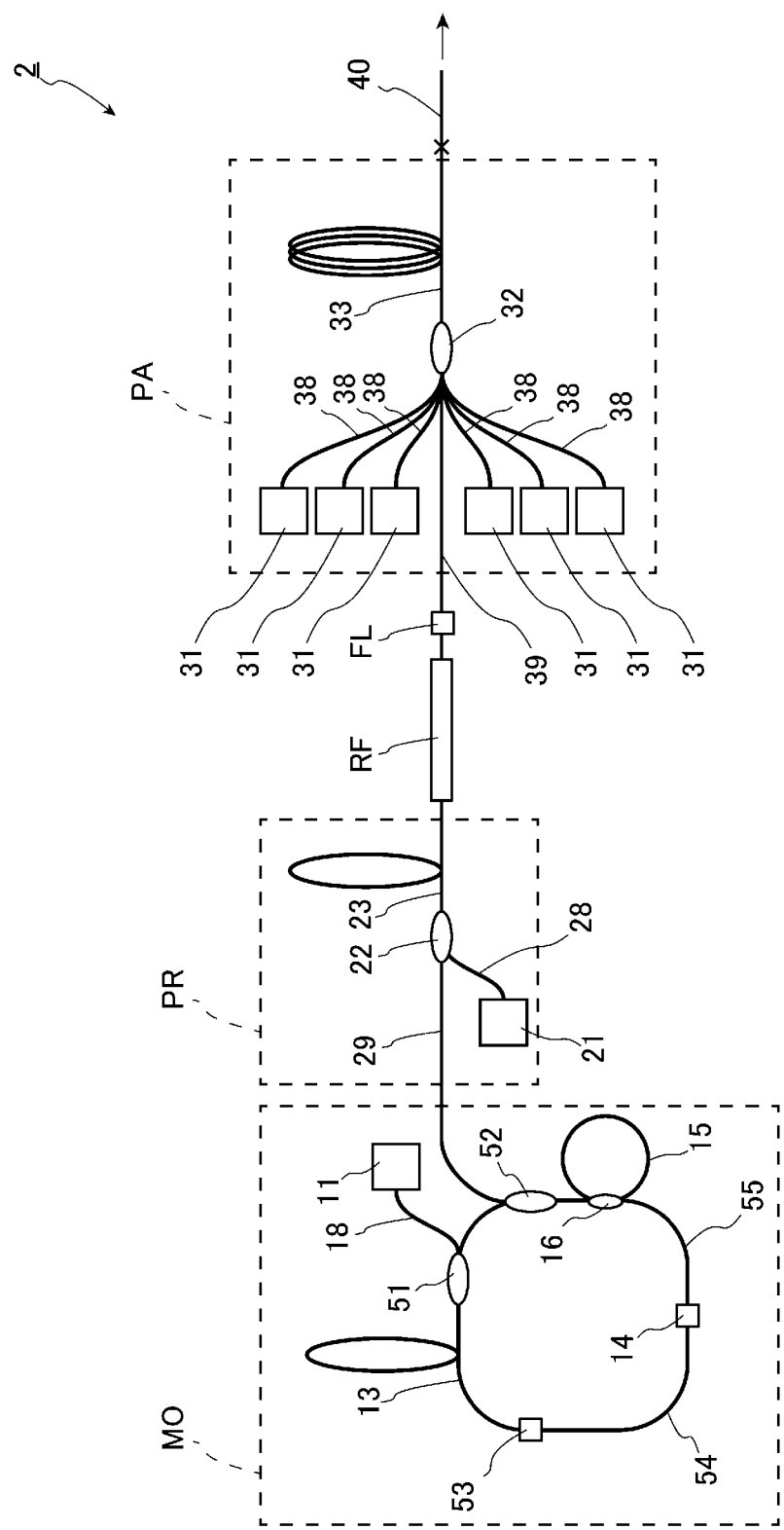
FIG. 5 illustrates a MO-PA fiber laser device including as a light source a fiber laser device according to a second embodiment of the present invention.

FIG. 5 illustrates a fiber laser device according to the present embodiment. As illustrated in FIG. 5, a fiber laser device 2 according to the present embodiment differs from the fiber laser device 1 according to the first embodiment in that the seed unit MO is a fiber-ring fiber laser device.

The seed unit MO according to the present embodiment mainly includes the pumping light source 11, the first optical fiber 18, an optical coupler 51, the amplification optical fiber 13, an optical filter 53, a second optical fiber 54, the AOM 14, a third optical fiber 55, the optical coupler 16, the loop optical fiber 15, and an optical coupler 52.

The optical coupler 51 optically couples the core of the first optical fiber 18 with the core of the amplification optical fiber 13. Thus, the optical coupler causes pumping light emitted from the pumping light source 11 and propagating through the first optical fiber 18 to enter the amplification optical fiber 13. Meanwhile, the first optical fiber 18 according to the present embodiment differs from the first optical fiber 18 according to the first embodiment in that no FBG is provided.

The optical filter 53 is a bandpass filter transmitting light having a predetermined wavelength and restricting transmission of light having another wavelength. The optical filter 53 has a similar configuration to that of the optical filter FL, for example. For example, in a case in which an active element added to the amplification optical fiber 13 is ytterbium, the optical filter 53 transmits light having a wavelength of 1060 nm. The optical filter 53 is connected to one end of the second optical fiber 54. The second optical fiber 54 has a similar configuration to that of the second optical fiber 19 according to the first embodiment.

To the other end of the second optical fiber 54 is connected the AOM 14. The AOM 14 according to the present embodiment differs from the AOM 14 according to the first embodiment in that the end surface thereof emitting light is provided with antireflective processing. The AOM 14 according to the present embodiment transmits light incident from the second optical fiber 54 in the first state in which the AOM 14 vibrates at the predetermined cycle. To a side of the AOM 14 opposite to a side thereof on which the second optical fiber 54 is located is connected one end of the third optical fiber 55. The third optical fiber 55 has a similar configuration to that of the second optical fiber 54. In the first state, the AOM 14 emits light incident from the second optical fiber 54 to the third optical fiber 55. Also, in the second state, the AOM 14 emits light incident from the second optical fiber in a different direction from that toward the third optical fiber 55.

Also, in the middle of the third optical fiber 55, the optical coupler 16 is provided. Similarly to the first embodiment, in which the second optical fiber 19 and the loop optical fiber 15 are connected at the optical coupler 16, the third optical fiber 55 and the loop optical fiber 15 are connected at the optical coupler 16.

Also, in the middle of an opposite side of the third optical fiber 55 to a side thereof on which the AOM 14 is located with reference to the optical coupler 16, the optical coupler 52 is provided. The optical coupler 52 connects the third optical fiber 55 to the optical fiber 29 of the preamplifier PR. Hence, light propagating the third optical fiber 55 deviates to the optical fiber 29 at a certain branching ratio and propagates the optical fiber 29.

Also, the other end of the third optical fiber 55 is connected to the optical coupler 51. That is, the optical coupler 51 connects the end portion of the first optical fiber 18, the end portion of the third optical fiber 55, and the end portion of the amplification optical fiber 13, and the core of the first optical fiber 18, the core of the third optical fiber 55, and the core of the amplification optical fiber 13 are optically coupled.

In the seed unit MO according to the present embodiment, in a case in which an optical path including the amplification optical fiber 13, the optical filter 53, the second optical fiber 54, the AOM 14, and the third optical fiber 55 is a specific optical path, the specific optical path is a looped optical path. Also, in the seed unit MO according to the present embodiment as well, since a loop optical path including the loop optical fiber 15 is connected to the specific optical path, the seed unit MO includes a plurality of optical paths. In the present embodiment as well, the optical path including the specific optical path and the loop optical path is a different optical path from the specific optical path and shares a part with the specific optical path. The light propagating through this optical path deviates at the optical coupler from the third optical fiber 55 to the loop optical fiber 15, travels through the loop optical fiber 15 one or more laps, and couples with the third optical fiber 55 at the optical coupler 16 from the loop optical fiber 15. Also, the optical paths each including the loop optical path are different optical paths from each other in a case in which the optical paths respectively have different numbers of times of the lap travel through the loop optical fiber 15. In this manner, since the loop optical fiber 15 is connected in the middle of the specific optical path, the lengths of the respective optical paths differ from each other. Hence, the resonance cycle of resonated light traveling on the specific optical path without deviating to the loop optical path and the resonance cycle of resonated light traveling on the loop optical path one or more laps in the middle of traveling on the specific optical path differ from each other.

In the present embodiment as well, at least the resonance cycle of light having the highest power out of the respective light beams resonated on the respective optical paths and the predetermined cycle at which the AOM 14 vibrates in the first state have a non-integral multiple relationship. In addition, each of the resonance cycles of the respective light beams resonated on the respective optical paths and the predetermined cycle at which the AOM vibrates preferably have a non-integral multiple relationship. For example, as described in the first embodiment, suppose that the vibration frequency at which the AOM 14 vibrates is 135 MHz, and that the vibration cycle is $74 \times 10^{-10}$ seconds. In this case, considered is a case in which the length of the aforementioned specific optical path is the basic optical path length S, in which the light speed is 299,792,458 m/s, and in which the refractive index of the optical fiber is 1.445. When the basic optical path length S is 1 m, the resonance cycle of light resonated on the specific optical path is approximately $1.0 \times 10^{-8}$ seconds. In this case, the resonance cycle of light resonated on the specific optical path and the predetermined cycle at which the AOM 14 vibrates in the first state have a non-integral multiple relationship. Also, in a case in which the basic optical path length S is 1 m, and in which the loop optical path length L serving as a length of the loop optical fiber 15 is 0.5 m, the resonance cycle of resonated light is approximately $1.3 \times 10^{-8}$ seconds on an optical path on which the light travels through the loop optical path one lap while the light is resonated, and the resonance cycle of resonated light is approximately $1.5 \times 10^{-8}$ seconds on an optical path on which the light travels through the loop optical path two laps while the light is resonated. Hence, in this case, each of the resonance cycles of respective light beams resonated on the respective optical paths and the predetermined cycle at which the AOM 14 vibrates in the first state have a non-integral multiple relationship.

In the seed unit MO according to the present embodiment, pumping light is being emitted from the pumping light source 11 at all times, and in a standby state, the AOM 14 is in the second state. Thus, in the standby state, even in a case in which light emitted from the amplification optical fiber 13 is transmitted through the optical filter 53 and propagates through the second optical fiber 54, light incident on the AOM 14 from the second optical fiber 54 does not enter the third optical fiber 55 but is emitted to the outside. Accordingly, light does not travel on the specific optical path and the optical path including the specific optical path and the loop optical path and is not resonated. Consequently, the pumping level of the active element of the amplification optical fiber 13 is raised. Meanwhile, in the present embodiment as well, a period in which the AOM 14 of the seed unit MO is in the second state is a period of no self oscillation in the amplification optical fiber 13.

Subsequently, immediately before pulsed light is emitted, the AOM 14 comes in the first state. Light incident on the AOM 14 from the second optical fiber 54 is then transmitted through the third optical fiber 55. Accordingly, light travels on the specific optical path and the optical path including the specific optical path and the loop optical path and is resonated on the respective optical paths. Due to this resonance light, the active element in the amplification optical fiber 13 highly pumped as described above causes stimulated emission, the resonance light is amplified, pulsed light is emitted from the AOM 14, and the light is emitted from the optical coupler 52 to the optical fiber 29 of the preamplifier PR. Subsequently, in a similar manner to that of the first embodiment, light is amplified in the preamplifier PR and the main amplifier PA, and the amplified light is emitted from the optical fiber 40.

As described above, the resonance cycle of light having the highest power out of the respective light beams resonated on the respective optical paths and the predetermined cycle at which the AOM 14 vibrates in the first state have a non-integral multiple relationship. Accordingly, in the present embodiment as well, the ripples of pulsed light emitted from the seed unit MO can be restricted. Accordingly, the ripple of light emitted from the fiber laser device 2 can be restricted.

The present invention has been described above by taking the embodiments as examples, and the present invention is not limited to these embodiments.

For example, in the fiber laser device 1 according to the above embodiment, an example in which the AOM 14 of the seed unit MO reflects light has been shown, and the present invention is not limited to this example. For example, the end surface of the AOM 14 may be subject to non-reflective processing, and a second FBG having lower reflectance than that of the FBG 12 may be provided between the AOM 14 and the preamplifier PR. In this case, when the AOM 14 is on to cause light to be transmitted through the AOM 14, the light is reflected on the second FBG, and oscillation can be generated between the FBG 12 and the second FBG. In this case, the path between the FBG 12 and the second FBG is the specific optical path.

Also, each of the above fiber laser devices 1 and 2 includes not only the seed unit MO but also the preamplifier PR, the main amplifier PA, the wavelength conversion unit RF, and the optical filter FL. However, in a case in which power of light emitted from the seed unit MO serving as a fiber laser device is high, the preamplifier PR, the main amplifier PA, the wavelength conversion unit RF, and the optical filter FL may not be provided.

EXAMPLES

Hereinbelow, an example and a comparative example will be shown to describe the contents of the present invention more specifically, and the present invention is not limited to the example.

Comparative Example

An optical system having an equal configuration to that of the seed unit MO according to the first embodiment was prepared. In this optical system, the predetermined cycle at which the AOM 14 vibrates was 135 MHz. Also, in this optical system, the relationship between the basic optical path length S, which is the specific optical path from the AOM 14 to the FBG 12 without traveling on the loop optical fiber 15, and the loop optical path length L, which is an optical path of the loop optical fiber 15, was set in the following manner.

$2S+3L=740$ cm

That is, in this optical system, the optical path was an optical path on which light travels on the loop optical fiber 15 three laps while the light is reciprocated between the AOM 14 and the FBG 12, and the optical path length was 740 cm. This optical path length is equal to a distance at which light propagates through the optical fiber during ten cycles at frequency of 135 MHz. That is, the resonance cycle of light in this optical system and the predetermined cycle at which the AOM 14 vibrates have an integral multiple relationship.

Example

An equal optical system to that of the comparative example was prepared except that the optical path length was 742 cm by setting the length of the basic optical path length 1 cm longer than that of the optical system in the comparative example. In this optical system, the resonance cycle of light and the predetermined cycle at which the AOM 14 vibrates have a non-integral multiple relationship.

Figure 6:
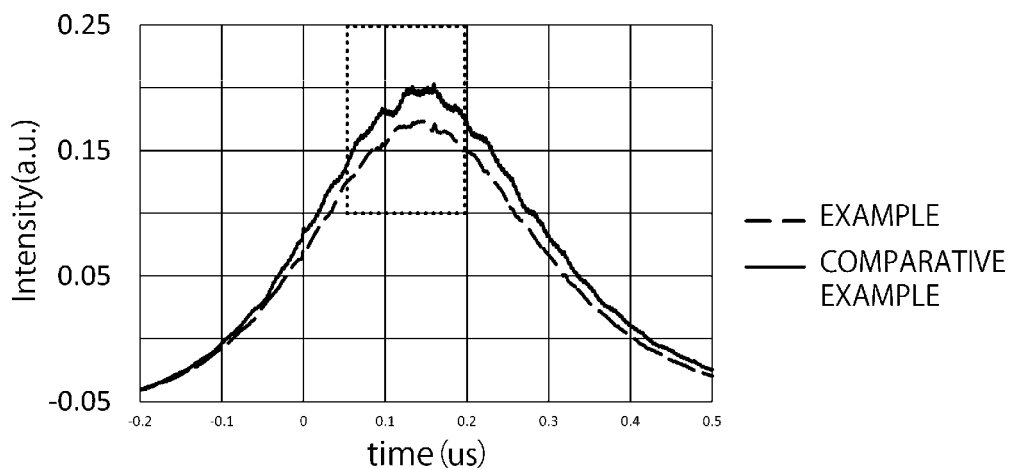
FIG. 6 illustrates temporal changes of the intensity values of light beams emitted from optical systems in a comparative example and an example.
Figure 7:
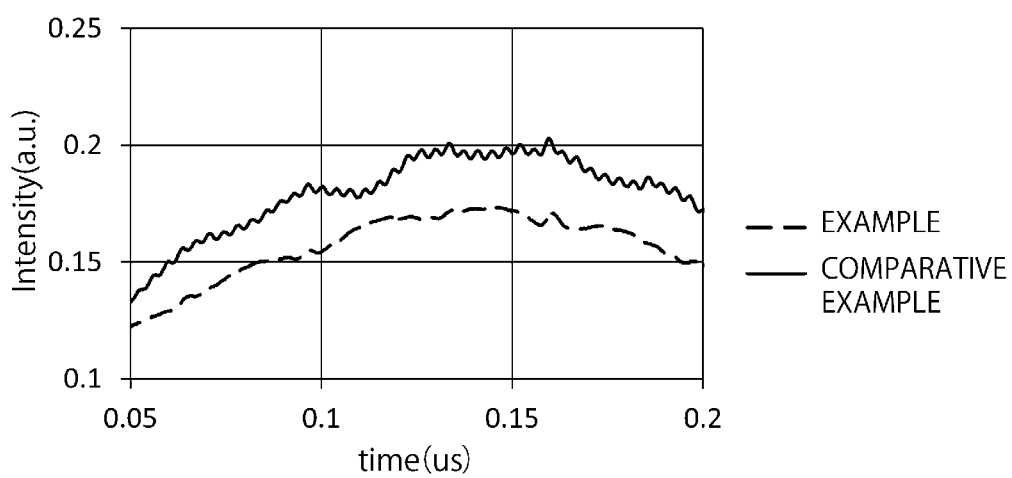
FIG. 7 is an enlarged view of the portion in FIG. 6 circled with the dashed line.

Subsequently, temporal changes of the intensity values of light beams emitted from the optical systems in the comparative example and the example were measured. The results are shown in FIG. 6, and the portion in FIG. 6 circled with the dashed line is shown in FIG. 7. As illustrated in FIGS. 6 and 7, in the comparative example, in which the resonance cycle of light and the predetermined cycle at which the AOM 14 vibrates had an integral multiple relationship, ripples were generated. On the other hand, in the example, in which the resonance cycle of light and the predetermined cycle at which the AOM 14 vibrates had a non-integral multiple relationship, it was found that ripples were restricted further than in the comparative example.

As described above, as was found in the example and the comparative example, it was found that ripples of emitted light were restricted according to the present invention.

As described above, according to the present invention, a fiber laser device enabling a ripple of emitted light to be restricted is provided, and the fiber laser device can be used in fields using laser light, such as in a processing machine and a medical instrument.

REFERENCE SIGNS LIST

1, 2 . . . fiber laser device
11, 21, 31 . . . pumping light source
13, 23, 33 . . . amplification optical fiber
15 . . . loop optical fiber
FL . . . optical filter
MO . . . seed unit (fiber laser device)
PA . . . main amplifier
PR . . . preamplifier
RF . . . wavelength conversion unit

The invention claimed is:

1. A fiber laser device comprising:
a plurality of optical paths sharing a part thereof and causing light to be resonated thereon;
an amplification optical fiber serving as a part of each of the plurality of optical paths and amplifying respective light beams resonated on each of the plurality of optical paths; and
an acoustic optic modulation arranged at a part shared by each of the plurality of optical paths and switchable between a first state, in which the acoustic optic modulation vibrates at a predetermined cycle and emits light incident from the plurality of optical paths to the plurality of optical paths, and a second state, in which the acoustic optic modulation emits light incident from the plurality of optical paths to a path other than the plurality of optical paths,
wherein a resonance cycle of light having highest power out of the respective light beams resonated on each of the plurality of optical paths and the predetermined cycle at which the acoustic optic modulation vibrates in the first state have a non-integral multiple relationship,
wherein the plurality of optical paths include a specific optical path and an optical path including the specific optical path and a loop optical path which is connected in the middle of the specific optical path and is formed in a looped shape, and
wherein light propagating through the specific optical path deviates to the loop optical path at a predetermined branching ratio, and light propagating through the loop optical path couples with the specific optical path at the predetermined branching ratio.

2. The fiber laser device according to claim 1, wherein each of resonance cycles of the respective light beams resonated on each of the plurality of optical paths and the predetermined cycle at which the acoustic optic modulation vibrates in the first state have a non-integral multiple relationship.

3. The fiber laser device according to claim 1, wherein the specific optical path is an optical path on which light is reciprocated between paired reflection units.

4. The fiber laser device according to claim 3, wherein the predetermined branching ratio is 3 dB or less, and the resonance cycle of light resonated on the specific optical path and the predetermined cycle at which the acoustic optic modulation vibrates in the first state have a non-integral multiple relationship.

5. The fiber laser device according to claim 3, wherein the predetermined branching ratio is 3 dB or more and 4.8 dB or less, and the resonance cycle of light resonated on an optical path traveling on the loop optical path one lap in the middle of the specific optical path and the predetermined cycle at which the acoustic optic modulation vibrates in the first state have a non-integral multiple relationship.

6. The fiber laser device according to claim 3, wherein the predetermined branching ratio is 4.8 dB or more, and the resonance cycle of light resonated on an optical path traveling on the loop optical path two laps in the middle of the specific optical path and the predetermined cycle at which the acoustic optic modulation vibrates in the first state have a non-integral multiple relationship.

7. The fiber laser device according to claim 3, wherein the predetermined branching ratio is 2 dB or more and 8 dB or less.

8. The fiber laser device according to claim 1, wherein the specific optical path is a looped optical path.

\* \* \* \* \*